UNITED STATES PATENT OFFICE.

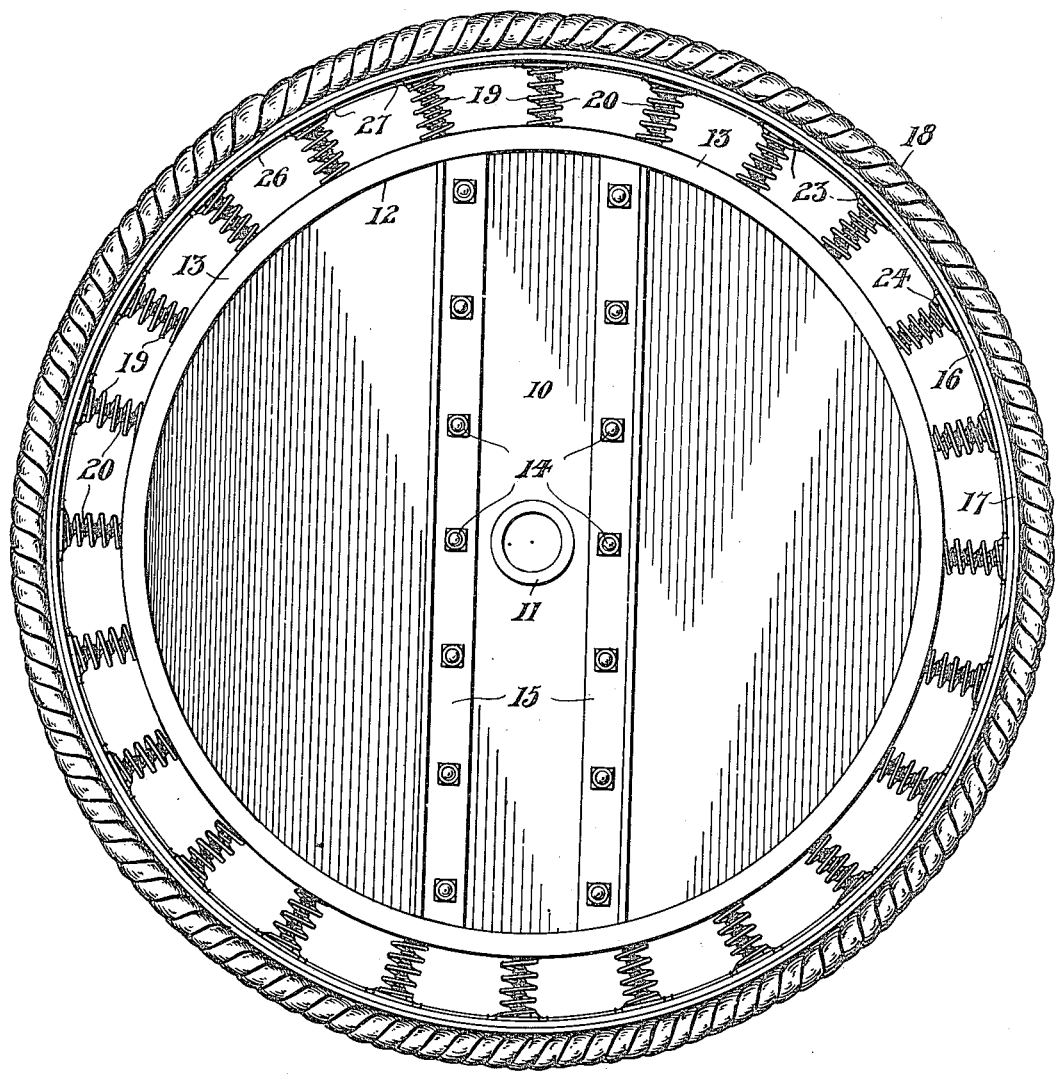

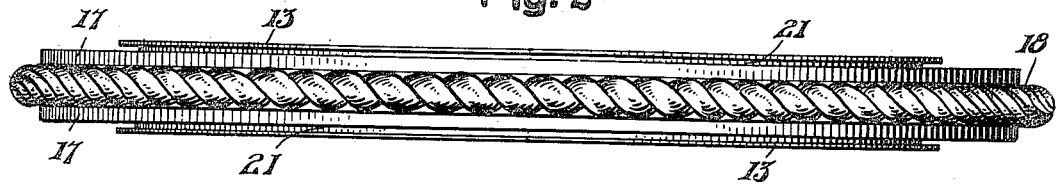
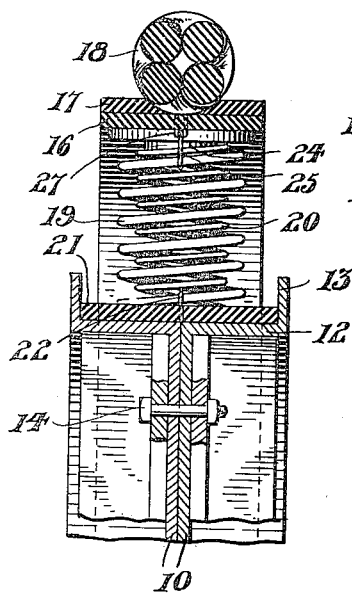
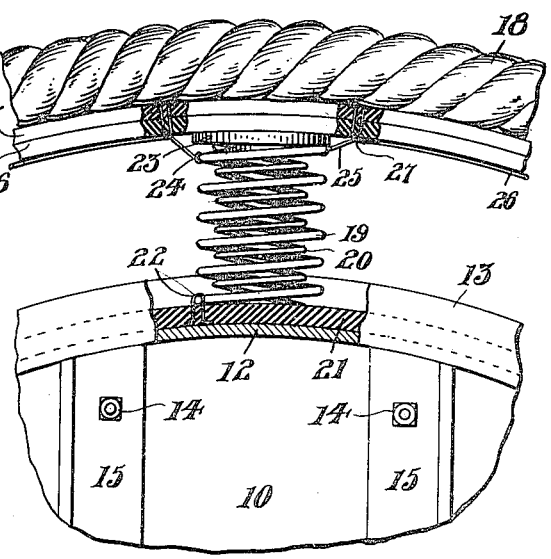
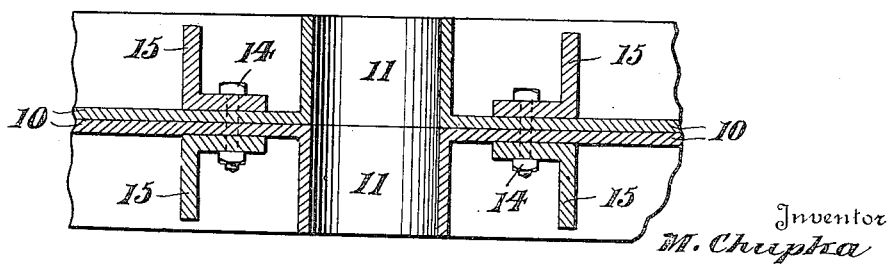

MIKLOS CHUPKA, OF JOHNSTOWN, PENNSYLVANIA, ASSIGNOR OF ONE-THIRD TO MICHAEL BULIK, OF CONEMAUGH, PENNSYLVANIA, AND ONE-THIRD TO SANDOR JARINA, OF JOHNSTOWN, PENNSYLVANIA.

SPRING-WHEEL.

1,168,283.

Specification of Letters Patent.   Patented Jan. 18, 1916.

Application filed July 13, 1915.   Serial No. 39,716.

*To all whom it may concern:*

Be it known that I, MIKLOS CHUPKA, a citizen of the United States, residing at Johnstown, in the county of Cambria and State of Pennsylvania, have invented certain new and useful Improvements in Spring-Wheels, of which the following is a specification.

This invention relates to certain new and useful improvements in spring wheels.

An object of the invention is to provide a spring wheel including a rigid inner rim portion and a deformable outer rim portion with cushioning springs arranged between the two rims.

A further object of the invention is to provide a spring wheel including a pair of spaced rim sections with cushion springs between the rim sections, while the rim constituting the tread is circumferentially grooved for the reception of a tread member preferably in the form of a heavy rope or cable.

With the above and other objects in view that will appear as the nature of the invention is better understood, the same consists in the novel construction, combination and arrangement of parts hereinafter more fully described, illustrated in the accompanying drawings, and pointed out in the appended claim.

In the drawings forming a part of this application and in which like designating characters refer to corresponding parts throughout the several views, Figure 1 is a side elevational view of a spring wheel built in accordance with the present invention. Fig. 2 is a top plan view of the same. Fig. 3 is a cross-sectional view of a portion of the wheel showing the construction of the rims with the cushioning springs positioned between the same. Fig. 4 is a side elevational view of a portion of the device, partly shown in section to illustrate the manner of securing the cushioning springs in position between the two rims, and, Fig. 5 is a detail sectional view of a portion of the wheel hub.

Briefly described, the present invention aims to provide a spring wheel including a rigid inner rim and hub portion and a deformable outer rim. The inner rim and hub portion are preferably formed of sheet metal, being formed in sections and riveted together with reinforcing members to provide a substantially rigid member. The outer rim is held in spaced relation with the inner rim by cushioning springs positioned between the same, suitable fastening means and guide members being associated with the springs and rims for holding the different parts in assembled position. The outer rim if desired may be formed of several layers of leather or rubber, or other material to meet certain conditions, the outer layer being circumferentially grooved for the reception of a rope or cable constituting the tread portion of the wheel.

Referring more in detail to the accompanying drawings, the reference numeral 10 designates the main body-portion of the wheel, the same being in the form of an annular plate, preferably formed of metal and formed at the center thereof with a tubular portion 11 outwardly directed therefrom so that when a pair of plates 10 are assembled, as shown in Fig. 5, the registering tubular portions 11 constitute the hub of the wheel. The outer edges of the plate members 10 are bent outwardly as at 12 at right angles to the said plate, with the edges of the bent portions 12 further bent at right angles as at 13 and parallel with the plates 10 to provide a rim portion including side flanges. The plates 10 are held in the position shown by fastening bolts or rivets 14 passing therethrough, and also through reinforcing angle irons 15, as clearly shown in Fig. 1 which extend completely across the plates adjacent the hub portions thereof and engage at their ends the rim portions 12. A deformable outer rim incloses the rigid inner rim and as shown in Figs. 3 and 4 includes two strips of material 16 and 17 which may be of rubber, leather, or other suitable material while the outer strip 17 is provided with a circumferential groove for the reception of a rope or cable 18 which constitutes the tread portion of the wheel. The springs for holding the two rims in spaced relation are arranged adjacent each other so that the cushioning properties of the outer rim will be evenly distributed, each spring including an enlarged outer compression coil spring 19 and an inner compression coil spring 20, one arranged within the other. A band of rubber or leather 21 is received on the inner rim 12 and upon which the inner ends of the springs 19 and 20 are seated, the said springs being retained in position thereon by suitable fastening means as indicated at 22, see particularly Fig. 4. The outer ends of the springs 19 and 20 are guided and held in fixed relation to the outer rim 16 by a block 23 carrying a boss 24 received in the outer convolutions of the springs, the said block being held against the outer rim by the expansion of the springs. The outer convolutions of each spring are connected by links 25 to a circumferential retaining member 26 positioned to lie adjacent the outer rim, the retaining member 26 being secured to the outer rim by fastening members 27, more clearly shown in Fig. 4.

From the above detailed description of the invention, it is believed that the construction and operation thereof will be readily apparent, it being noted that when it is desired to support a light vehicle on wheels of the present type, the cushioning springs may be light, but when desired to support a heavy vehicle, the springs possess greater strength and prevent the hub portion of the wheel from being dished. It is to be understood that the present showing is the preferred form of construction and that various changes may be made in the invention without departing from the spirit and scope as set forth in the subject-matter claimed.

What I claim as new is:—

A spring wheel including a rigid inner rim section and a deformable outer rim section in spaced relation thereto, outwardly directed flanges at the outer edges of the inner rim, compression coil springs arranged between the inner and outer rims, guide blocks engaging the inner face of the outer rim section and carrying bosses for reception in the outer ends of the coil springs, staples engaging the inner convolution of each spring for securing the same to the inner rim, tie wires extending about the inner face of the outer rim and secured at spaced points to the outer rim, and connections between the outer convolutions of each spring and the tie wires.

In testimony whereof I affix my signature.

MIKLOS CHUPKA.

Copies of this patent may be obtained for five cents each, by addressing the "Commissioner of Patents, Washington, D. C."